(12) United States Patent
Matsui

(10) Patent No.: US 6,587,591 B1
(45) Date of Patent: Jul. 1, 2003

(54) CODE IMAGE QUALITY CHECKING DEVICE

(75) Inventor: Shinzo Matsui, Kitatsuru-gun (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/325,190

(22) Filed: Jun. 3, 1999

(30) Foreign Application Priority Data

Jul. 23, 1998 (JP) .......................................... 10-207835

(51) Int. Cl.$^7$ ................................................ G06K 9/36
(52) U.S. Cl. ...................................... 382/254; 382/181
(58) Field of Search ........................ 382/254, 137–140, 382/181–184, 209

(56) References Cited

U.S. PATENT DOCUMENTS

| | | | |
|---|---|---|---|
| 3,903,503 A | * | 9/1975 | Dillingham et al. ......... 382/182 |
| 3,967,241 A | * | 6/1976 | Kawa .......................... 382/205 |
| 3,987,411 A | * | 10/1976 | Kruklitis et al. ............. 382/137 |
| 5,194,720 A | | 3/1993 | Reinnagel et al. |
| 5,837,983 A | | 11/1998 | Actis et al. |

FOREIGN PATENT DOCUMENTS

| | | |
|---|---|---|
| EP | 0 670 555 A1 | 9/1995 |
| EP | 0 717 398 A2 | 6/1996 |
| JP | 5-77530 | 3/1993 |
| JP | 9-179930 | 7/1997 |

* cited by examiner

*Primary Examiner*—Thomas D. Lee
*Assistant Examiner*—Stephen Brinich
(74) *Attorney, Agent, or Firm*—Frishauf, Holtz, Goodman & Chick, P.C.

(57) ABSTRACT

A code image quality checker us provided which reduces the time required to check the quality of a code image having dots printed at high density. The code image quality checker includes a code image reader that captures the code image, performs binarization, detects the dots of the code image, and allocates a value of either 1 or 0 for each dot to provide dot arrangement data. In addition, the code image quality checker includes a parameter information output unit for outputting parameter information used to control adaptively the operation of each component of the code image reader in accordance with the quality of the code image.

11 Claims, 7 Drawing Sheets

CODE IMAGE QUALITY CHECKING DEVICE

BACKGROUND OF THE INVENTION

The present invention relates generally to an information recording medium having an area which is optically readably printed in a given format with a code image comprising an arrangement of a plurality of dots corresponding to data containing at least information such as sound, video and text. More particularly, the present invention relates to a system for checking the quality of such a code image.

For example, in published European applications EP 670,555 and 717,398 assigned to the same assignee as this application are disclosed a dot code which is a code image for allowing data containing information, such as sound, video, or text, to be optically readably printed at high density in a given format and a code image reading device for optically reading the dot code by an operator's manual scanning operation and reproducing information such as original sound.

Here, FIG. 8 shows a physical format of such a dot code.

As shown in FIG. 8, a dot code 100, representing information, such as sound, in the form of an arrangement of dots, is two-dimensionally divided into a plurality of blocks 101. Each block is composed of a data area 103, markers 102, a pattern dot area 104, and a block address pattern area 105.

In the data area 103 of each block there exists data as a dot image of white or black dots indicative of 0s or 1s arranged in a predetermined format. The markers 102 are used to find a reference point for detecting each dot in the data area and are located at four corners of each block. These markers, defining the blocks, are arranged at regular intervals from top and bottom and from left to right. In each block, its associated pattern dot area 104 is located between the left-side markers 102 and its associated block address pattern area 105 is located between the bottom markers and has an error detecting or correcting code. The block address pattern area is used to identify the corresponding block in a read operation.

FIG. 9 shows a block diagram of the conventional code image reader for optically reading the dot code 100.

As shown in FIG. 9, the code image reader comprises an imaging unit 201, an image memory 202, a binarization unit 203, an image memory 204, a restoration unit 205, and a reproduction unit 206. In more detail, the restoration unit 205 comprises a center-pixel-in-dot detecting section 205a and a dot decision section 205b, and the reproduction unit 206 comprises a demodulation section 206a, an interleave memory 206b, an interleave and error correction section 206c, and an output section 206d.

The imaging unit 201 is equipped with an illumination section having a light emitting diode (LED) for illuminating the dot code 100, a solid state imaging device such as a charge coupled device (CCD), and an optical system for focusing reflected light from the dot code onto the CCD. The image memory 202 subjects an image signal output from the imaging unit to digitization and then stores the resulting digital image signal. The binarization unit 203 subjects the digital image signal read from the image memory 202 to thresholding for binarization. The image memory 204 stores the resulting two-valued image data from the binarization unit 203. The restoration unit 205 detects dots from the two-valued image data read from the memory and allocates a value of either 0 or 1 for each dot to thereby output dot arrangement data. The reproduction unit 206 is responsive to the dot arrangement data from the restoration unit to reproduce the original information such as sound.

The code image reader thus arranged, even if the size of the entire dot code is larger than the field of view, or the imaging area 100a, 100b of the imaging unit 201, allows the dot code to be read by scanning each of consecutive image regions in sequence by manually moving the imaging unit 201 over the code image in the direction indicated by an arrow.

That is, even if the entire dot code 100 cannot be imaged at one time, the original data can be reconstructed from dot arrangement data in each block 101 if the address assigned to each block can be read and recognized correctly.

Thus, the code image techniques described above allow a lot of information to be stored at high densities on media such as paper, which is impossible with conventional one-dimensional or two-dimensional bar codes. The techniques, which allow easy transfer of information, such as sound, through paper, have been increasingly expected to find extensive applications which have not been supposed so far.

Here, the binarization unit 203 is arranged to control adaptively the threshold value for binarization according to printing conditions of the code image, for example, the density of white dots (paper surface) or black dots. Even if the printing quality of the code image is somewhat bad, therefore, an appropriate operation is performed accordingly.

In reading the two-valued image data from the image memory 204 and detecting dots, the restoration unit 205 is arranged to control adaptively the reference points for detecting the dots according to printing conditions of the code image, i.e., printing displacements of the dots and their deformation. As in the binarization unit 203, even if the printing quality of the code image is somewhat bad, the restoration unit performs an appropriate operation accordingly. The restoration unit, which is basically constructed from the central-pixel-in-dot detecting section 205a and the dot decision section 205b, first detects the markers 102 and then, on the basis of the pattern dot reading reference point determined by the detected markers and format information, searches the pattern dot area 104 for each dot and computes the dot detecting reference point for which an error function defined by distances between the ideal centers of dots constituting the pattern dot area 104 and the centers of the corresponding dots actually searched for is minimized.

This search operation is described in Japanese Unexamined Patent Publication No. 8-171620.

The restoration unit further detects the central pixel in each dot on the basis of the detecting reference point thus computed, decides whether the detected dot is black or white, allocates a value of either 1 or 0 for the detected dot, and outputs dot arrangement data. Thus, even if the printing quality of the code image having dots printed at high density is bad, the code image can be read quite satisfactorily.

Such code images will be printed under various printing conditions including various types of printing machines, various printing materials such as paper and inks, and printing machine management methods. Thus, in order to allow code images to be read stably at all times, it is required to maintain always the printing quality of code images themselves constant.

In general, the quality control of conventional bar codes is performed on the basis of the width and the density or contrast of bars specified in JIS standards JIS X 0501, 0502 and so on.

Specifically, the quality is checked using a checking device as disclosed in, for example, Japanese Unexamined Patent Publication No. 5-77530.

As described above, however, in a code image reader for optically reading a code image having dots printed at high density, such as dot code 100, even if the printing quality of the code image is not good, the binarization unit 203 and the restoration unit 205 operate adaptively to read the code image successfully. Thus, the utilization of the bar code checking method for code images without modification results in an increase in the checking time and the size of the checking device. In addition, the checking method is no longer suitable for checking devices for checking high-density code images. Therefore, there arises need to establish anew a quality checking method that is the most suitable for high-density code images.

From a standpoint that the original purpose of checking the quality of a code image itself is to confirm whether original information such as sound can be recovered with certainty from that code image, it can be said that the most suitable checking method is to read the code image to be checked with the code image reader and then confirm whether the original information can be reproduced or not.

However, this approach still has the checking time problem. In addition, in view of the uncertainty of reading by manual scanning, the confirmation alone makes it difficult to allow the inspection to have correctness or objectivity. It is thus impossible to say that the method is perfect. For example, if the original data is sound information, it takes long to reproduce sound. The inspection based on the sense of hearing results in lack of correctness or objectivity.

The manual scanning is subject to variation from time to time. In the case of abnormal manual scanning, even if the quality of the code image is good, the original information may not be reproduced. Further, even if the original information is reproduced with optimum manual scanning, the next manual scanning may fail to reproduce the original information.

BRIEF SUMMARY OF THE INVENTION

It is therefore an object of the present invention to provide a code image quality checking device and method which minimizes the time required to check the quality of code images and is suitable for code images having dots printed at high densities.

To attain the object, there is provided a code image quality checker for checking the quality of a code image which contains a plurality of dots arranged in accordance with data containing at least sound information and is optically readably recorded in a given format on a portion of a recording medium, comprising: imaging means for capturing the code image on the recording medium and outputting an image signal; binarization means for subjecting the image signal from the imaging means to binarization to output two-valued image data; restoration means for detecting the dots from the two-valued image data and allocating each of the dots detected for a value of either 1 or 0 to output dot arrangement data; reproduction unit responsive to the dot arrangement data from the restoration means to recover the data containing at least sound information; adaptive read control means for adaptively controlling the operation of each of the imaging means, the binarization means, the restoration means, and the reproduction means according to the quality of the code image; and parameter information output means for outputting to outside parameter information used by the adaptive read control means to control adaptively the operation of each of the imaging means, the binarization means, the restoration means, and the reproduction means, the parameter information being employed to check the quality of the code image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 8:
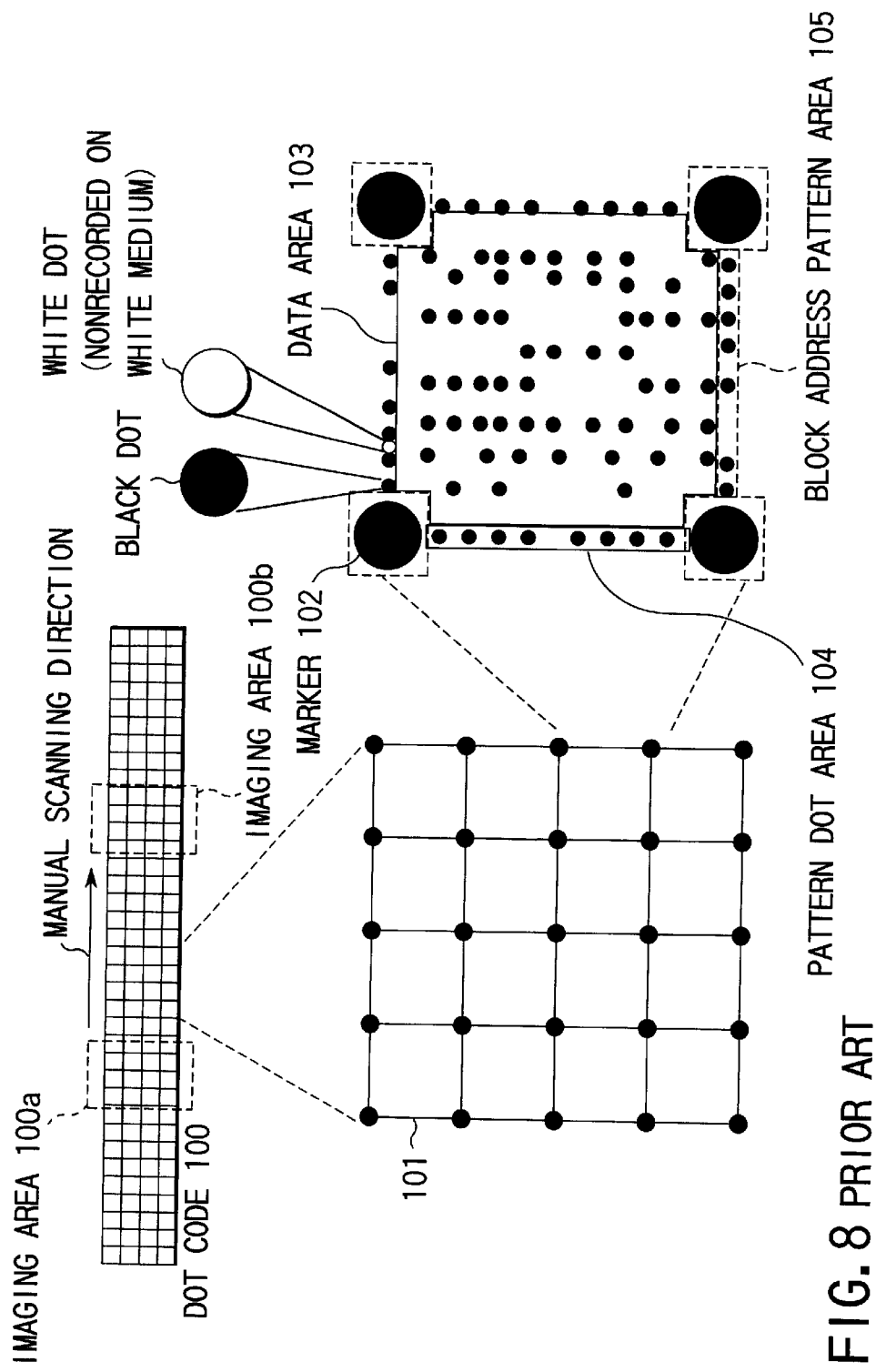
FIG. 8 shows the physical format of an existing dot code.

For better understanding of the embodiments of the invention, a code image reader that the present invention supposes will be described first and a code image quality checker of the present invention will be described next. The previously described dot code of FIG. 8 is taken as a code image used in the embodiments of the present invention. Thus, in the description below, an explanation will be made using the reference numerals used in FIG. 8.

Figure 1:
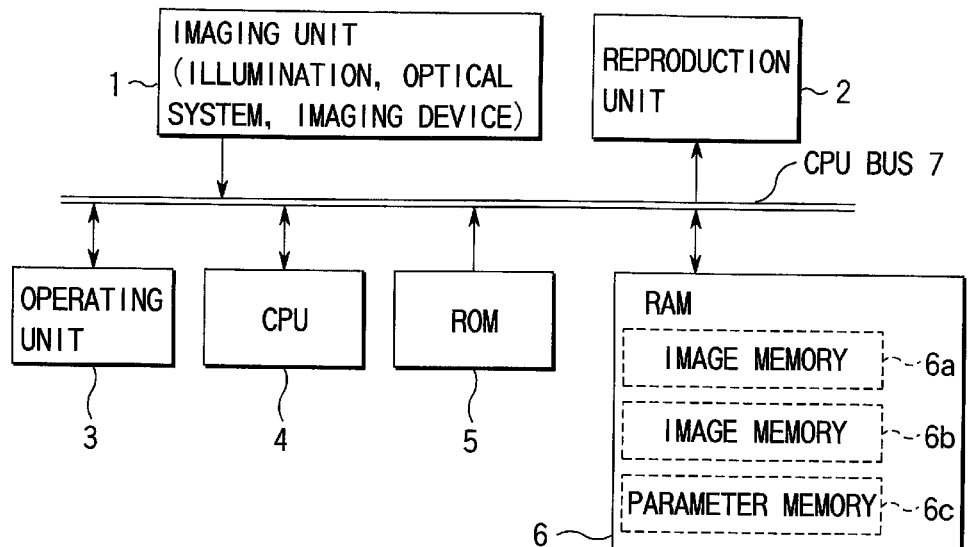
FIG. 1 shows an arrangement of a code image reader that the present invention supposes.

Referring now to FIG. 1, there is shown the arrangement of the code image reader.

As shown in FIG. 1, an imaging unit 1, a reproduction unit 2, an operating unit 3, a CPU (central processing unit) 4, a ROM (read-only memory) 5, a RAM (random access memory) 6 are coupled to a CPU bus 7 over which data is transferred.

The imaging unit 1, including an illumination section for illuminating the dot code, an optical system, an imaging device and so on, captures the dot code through the optical system and outputs image data. The RAM 6 has image memories 6a and 6b and a parameter memory 6c. The image data from the imaging unit 1 is stored into the image memory 6a.

The CPU 4 performs prescribed operations processing on input image data in accordance with programs prestored into the ROM 5 and controls the operation of each component and the entire device. In addition to the programs for the operations processing by the CPU, the ROM 5 prestores various settings, tables, etc. The RAM 6 stores error corrected coded data containing, for example, sound information, which has been subjected to processing by the CPU 4 and is to be output to the reproduction unit 2, and parameter information as control information. The operating unit 3 has operating switches or the like for inputting an instruction to turn the power ON and user instructions. The reproduction unit 2 includes a speaker and a monitor for outputting the original sound and video information based on recovered dot arrangement information and a printer for printing out the output information.

Hereinafter, the operation of the CPU 4 in the code image reader will be described in detail with reference to a flowchart of FIG. 2.

When the power switch in the operating unit 3 is turned ON, the device is first initialized (step S1). In this initialization step, each memory in the RAM 6 is checked and cleared, illumination in the imaging unit 1 is turned OFF, the imaging device is checked for operation, the display screen in the reproduction unit 2 is cleared, and the speaker is made silent. At the time of initialization, a binarization threshold prestored in the ROM 5 is read into the binarization threshold area in the RAM 6 for subsequent use in step S4.

Next, it is detected whether or not an operating switch in the operating unit 3 has been depressed by the user as an instruction to read a dot code (step S2). If the switch has not been depressed, then the device is placed in the wait state. If, on the other hand, the switch has been depressed, then the procedure goes to step S3. In this step, the imaging unit 1 including the illumination section and the imaging device are put into operation to capture a code image and the resulting image data is stored into the image memory 6a (step S3). Subsequently, the image data in the memory 6a is subjected to binarization using the binarization threshold stored in the binarization threshold area of the RAM 6 and the resulting two-valued image data is stored into the image memory 6b (step S4).

In subsequent step S5, the markers 102 are detected. Each marker is considered as a group of a predetermined number of consecutive blacks. The markers, which are located at four corners of the block 101, are detected by detecting such groups of consecutive blacks and an arrangement of these groups from the two-valued image data in the image memory 6b. The position of the pattern dot area 104 is detected on the basis of the markers 102. Further, the center of gravity of each dot in the pattern dot area 104 is detected to calculate accurately the true positions of centers of the markers as reading reference points (detecting basic points). The area of each dot in the pattern dot area 104 is detected, and their average area is calculated. A binarization threshold expected to be the most suitable for the dot code 100 is calculated from the average area and a binarization threshold stored into the binarization threshold area (the image memory 6b). The binarization threshold is stored into the binarization threshold area as a binarization threshold for image data to be captured next.

Next, in step S6, the block address pattern 105 of the block 101 whose four markers have been detected is detected and then block address error correction is made. The error corrected block address is stored into a given area in the RAM 6 as a block address already captured.

In subsequent step S7, in accordance with the format shown in FIG. 8, the original dot arrangement data consisting of 1s or 0s for black dots or white dots is detected by reference to the reading reference points and then stored into an area of the RAM 6 designated by the detected block address of the block 101. In subsequent step S8, the state of the operating switch is detected. If it is in the depressed state, then the procedure returns to step S3 to capture the next image and then the processing through step S7 is repeated. If the two-valued image data stored into the image memory 66 at the step S4 don't contain at least one of the blocks of the dot code, then the step S5–S7 isn't operated, and procedure goes to step S8.

If, on the other hand, the switch is not depressed, then the procedure goes to step S9. The reproduction unit 2 performs demodulation processing to restore the modulation processing at the time of recording and then stores recovered image data in its interleave memory (step S9). In the interleave and error correction processing in the reproduction unit, the recovered data is read from the interleave memory and then subjected to deinterleave and error correction processing. In the output processing, the data is subjected to expansion and then outputted through an output device such as a speaker (step S10). Then, the operation of the CPU 4 terminates.

A code image quality checker of the present invention for checking the quality of the code image read by the code image reader described so far will be described next in detail.

Figure 3:
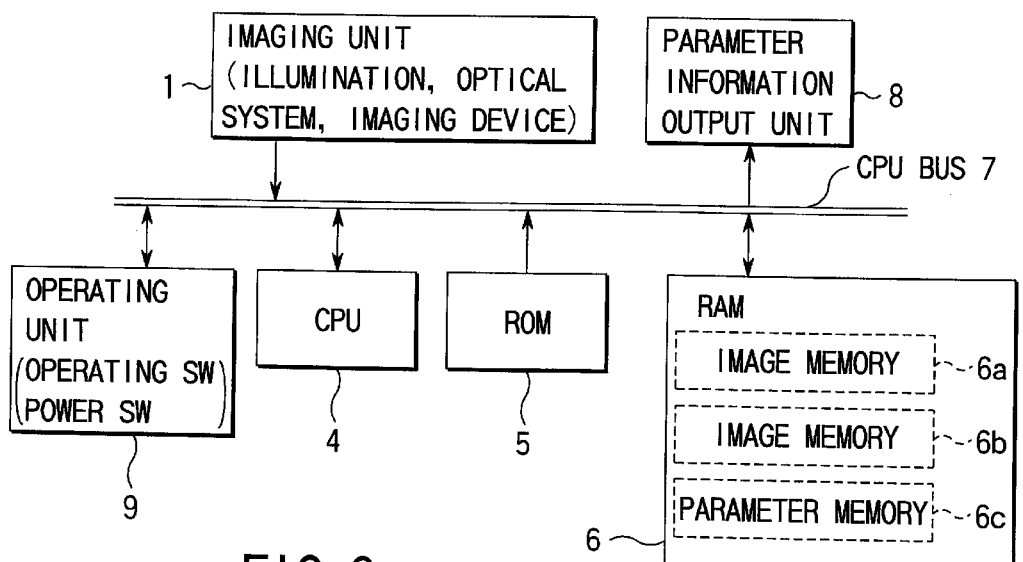
FIG. 3 shows an arrangement of a code image quality checker according to a first embodiment of the present invention.

FIG. 3 shows the arrangement of a code image quality checker according to a first embodiment of the present invention.

As shown in FIG. 3, an imaging unit 1, a CPU 4, a ROM 5, a RAM 6, a parameter information output unit 8, and an operating unit (including an operating switch and a power switch) 9 are coupled to a CPU bus 7.

The imaging unit 1, including an illumination section for illuminating the dot code, an optical system, an imaging device and so on, captures the dot code through the optical system and outputs image data. The RAM 6 has image memories 6a and 6b and a parameter memory 6c. The image data from the imaging unit 1 is stored into the image memory 6a.

The CPU 4 performs prescribed operations processing on input image data in accordance with programs prestored into the ROM 5 and controls the operation of each component and the entire device. In addition to the programs for the operations processing by the CPU, the ROM 5 prestores various settings, tables, etc. The RAM 6 stores error corrected coded data containing, for example, sound information, which has been subjected to processing by the CPU 4 and is to be output to the reproduction unit 2, and parameter information as control information. The operating unit 3 has operating switches or the like for inputting an instruction to turn the power ON and user instructions.

The parameter information output unit 8, which constitutes a feature of the code image quality checker of the present invention, is provided to output predetermined parameter information stored in the parameter memory 6c in the RAM 6 to the outside. It should be noted here that the parameter information is not necessarily limited to the contents of the RAM 6 but may be parameter information which is used, according to the quality of the code image, in the illumination section of the imaging unit 1, the binarization processing, and an adaptive read controller composed of the CPU 4, ROM 5, and RAM 6.

Hereinafter, the operation of the CPU 4 in the code image quality checker will be described in detail with reference to a flowchart of FIG. 4.

When the power switch in the operating unit 3 is turned ON, the device is first initialized (step S11). In this initialization step, each memory in the RAM 6 is checked and cleared, illumination in the imaging unit 1 is turned OFF, the imaging device is checked for operation, the display screen in the reproduction unit 2 is cleared, and the speaker is made silent. At the time of initialization, a binarization threshold prestored in the ROM 5 is read into the binarization threshold area in the RAM 6 for subsequent use in step S4.

Next, it is detected whether or not an operating switch in the operating unit 3 has been depressed by the user to give an instruction to read a dot code (step S12). If the switch has not been depressed, then the device is placed in the wait state. If, on the other hand, the switch has been depressed, then the procedure goes to step S13.

In this step, the imaging unit 1 including the illumination section and the imaging device is put into operation to capture a code image and the resulting image data is stored into the image memory 6*a*. Parameter information generated in this step is stored into the parameter memory 6*c* (step S13). The parameter information here is the light quantity setting of the illumination section.

Subsequently, the image data in the memory 6*a* is subjected to binarization using the binarization threshold stored in the binarization threshold area of the RAM 6 and the resulting two-valued image data is stored into the image memory 6*b*. The binarization threshold generated in this step is stored in the parameter memory (step S14).

In subsequent step S15, the markers 102 are detected. Each marker is considered as a group of a predetermined number of consecutive blacks. The markers, which are located at four corners of the block 101, are detected by detecting such groups of consecutive blacks and an arrangement of these groups from the two-valued image data in the image memory 6*b*. The position of the pattern dot area 104 is detected on the basis of the markers 102. Further, the center of gravity of each dot in the pattern dot area 104 is detected to calculate accurately the true positions of centers of the markers as reading reference points (detecting basic points). The area of each dot in the pattern dot area is detected to calculate their average area. A binarization threshold expected to be the most suitable for the dot code 100 is calculated from the average area and a binarization threshold stored into the binarization threshold area. The binarization threshold is stored into the binarization threshold area as a binarization threshold for image data to be captured next. The reading reference points and the center of gravity and area of each dot in the pattern dot area 104 are stored in the parameter memory 6*c* as parameters.

Next, in step S16, the block address pattern 105 of the block 101 having its associated four markers detected is detected and then block address error correction is made. The error corrected block address is stored into a given area in the RAM 6 as a block address already captured.

In subsequent step S7, in accordance with the format shown in FIG. 8, the original dot arrangement information consisting of either 1s or 0s for black dots or white dots is detected with reference to the reading reference points and then stored into a location in the RAM 6 designated by the error-corrected block address.

In subsequent step S18, the state of the operating switch is detected. If it is in the depressed state, then the procedure returns to step S13 to capture the next image and then the processing through step S17 is repeated again.

If, on the other hand, the switch is not depressed, then the procedure goes to step S19. In this step, the contents of the parameter memory are read and then convert the contents to a value information which is suitable for inspection as required, and displayed on a given area of the monitor screen in the parameter information output section 8 with a title and unit added for each parameter. Here, the contents of the parameter memory 6*c* are the parameter information generated in each of steps S13 through S16.

Figures 5, 7:
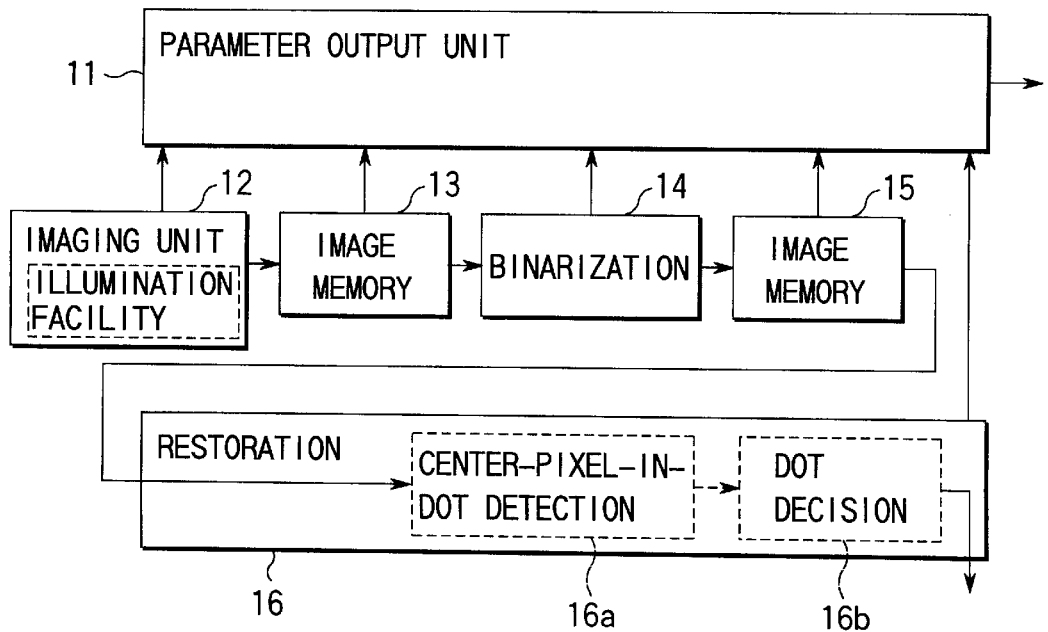
FIG. 5 shows an information display on the monitor associated with the parameter information output unit of FIG. 3.
FIG. 7 shows an arrangement of a code image quality checker using IC chips according to a second embodiment of the present invention.

FIG. 5 shows an example of an information display on the monitor in the parameter information output unit 8. Of course, the monitor is not restricted to use in the parameter information output unit 8.

As described previously, the parameter information includes a light quantity setting, a binarization threshold, reading reference points, and the center of gravity and area of each dot in the pattern dot area. These parameters are displayed after conversion in the form of FIG. 5.

In FIG. 5, "dot diameter ($\mu$m)", "paper white level", "marker-to-marker distance (mm)", and "P dot distance ($\mu$m)" and "variance in P transverse position" are titles indicative of dot code quality items and their respective units are placed in parentheses. "Accept or reject" indicates the title for the result of inspection about the dot code quality items.

In FIG. 5, numerical values separated by: from the quality items are measurements of the respective parameters. The numerical value to the left of (max) indicates the maximum of a plurality of parameter values about a plurality of read flame which are obtained in a single read operation. The numerical value to the left of (avr) indicates the average of the plurality of parameter values. The numerical value to the left of (min) indicates the minimum of the plurality of parameter values about a plurality of read flame which are obtained in a single read operation.

The mark "○" or "X" displayed in each box to the right of the measurements indicates the result of judgment of whether corresponding parameter values are to be accepted or rejected in light of standard values of upper and lower limits prestored in the ROM 5. The mark "○" indicates that the corresponding parameter values are within the limits allowed. The mark "X" indicates otherwise. For example, in FIG. 5, when the maximum of "dot diameter ($\mu$m)" is 75 $\mu$m and the minimum of "dot diameter ($\mu$m)" is 50 $\mu$m, 80 (max) is over the maximum that detected result is failure and "ラ" is displayed.

In the field separated by: from the title of "accept or reject" is displayed a mark indicating the result of synthetic judgment. That is, if all the quality items are satisfied, "○" is displayed; otherwise "ラ" is displayed.

The synthetic judgment has been described as being made based on the results of judgment for all the quality items. Alternatively, the synthetic judgment may be made based on a combination of the results of judgment for some of the quality items.

Moreover, the output information is not necessarily limited to display on the display monitor. For example, the parameter information may be saved onto a magnetic disk, converted into sound information, or printed out. In addition, the parameter information may be outputted after converting to the values in the parameter information output unit 8.

Furthermore, although the embodiment has been described as handling the light quality, the binarization threshold, the reading reference points, and the center of gravity and area of each dot in the pattern dot area as the parameter information, this is not restrictive. As the parameter information, parameter information may be used which is used in the adaptive read control means to read code images in accordance with their quality.

The parameter information indicates the quality of the code image 100 and is effective in checking the quality.

Hereinafter, the embodiment will be described in more detail for each piece of parameter information.

First, a description is given of the case where the reading reference points are used as parameter information. The reading reference points correspond to the positions of centers of the respective markers 102 located at the four corners of the block 101 as described in connection with FIG. 8. Thus, information concerning the reading reference points can be converted into the distance between two adjacent makers of block containing the four markers and the marker-to-marker distance can be checked as one of quality items of the dot code 100.

That is, when reading a dot code having a marker-to-marker distance larger than a given value, it is disorder state that the code image reader fails to detect the arrangement of groups of blacks previously described in connection with step S5 and to recover the original dot arrangement data. The code image quality checker of this embodiment can measure a margin with respect to the given marker-to-marker distance for each dot code and compare the measurement with a reference value for the margin, thus, allowing the marker-to-marker distance to be checked.

In recording a dot code, some of general-purpose low-cost ink jet printers and thermal printers having mechanical means for moving a print head in the main scanning direction and mechanical means for carrying a recording medium such as paper in the sub-scanning direction show variations in the marker-to-marker distance due to poor precision of the mechanical means. For such apparatus as well, the checking of marker-to-marker distance can be to be effective.

Second, a description is given of the case where the center of gravity of each dot in the pattern dot area is parameter information.

The pattern dot area 104 of the dot code 100 shown in FIG. 8 comprises a plurality of independent (isolation) dots that are black dots each surrounded with white dots.

The code image quality checker for checking the quality of a code image read by the code image reader equipped with the restoration unit having the pattern dot-based true center detecting processing, reading the dot code 100, and outputs the position of center of each dot in the pattern dot area 104 detected by the true center detecting facility through the pattern information output unit 8 as parameter information.

The position of the center of each dot in the pattern dot area 104 is associated with the recording accuracy of the code image recorder which records the dot code 100.

Therefore, when the position of the center of each dot in the pattern dot area 104 is detected, the recording accuracy of the recorder is examined, and as a result, the quality of the pattern dot area 104 recorded by the recorder to is detected.

Third, a description is given of the case where the parameter information is light quantity settings.

The light quantity setting in the illumination section of the imaging unit 1 can be changed in nine steps from first to tenth light quantities. The predetermined maximum light quantity setting is taken as the first light quantity. The second light quantity is set to be twenty percent lower than the first light quantity. The third light quantity is set to be twenty percent lower than the second light quantity. Likewise, each of the fourth to tenth light quantities is sequentially decreased by twenty percent.

Each pixel in captured image data consists of eight bits of data and is represented by a numerical value in the range of 0 to 255. The brightest level is represented by 255. When the captured image data has a value of 255, it means that the light quantity is excessive and proper image data cannot be obtained.

Figure 6:
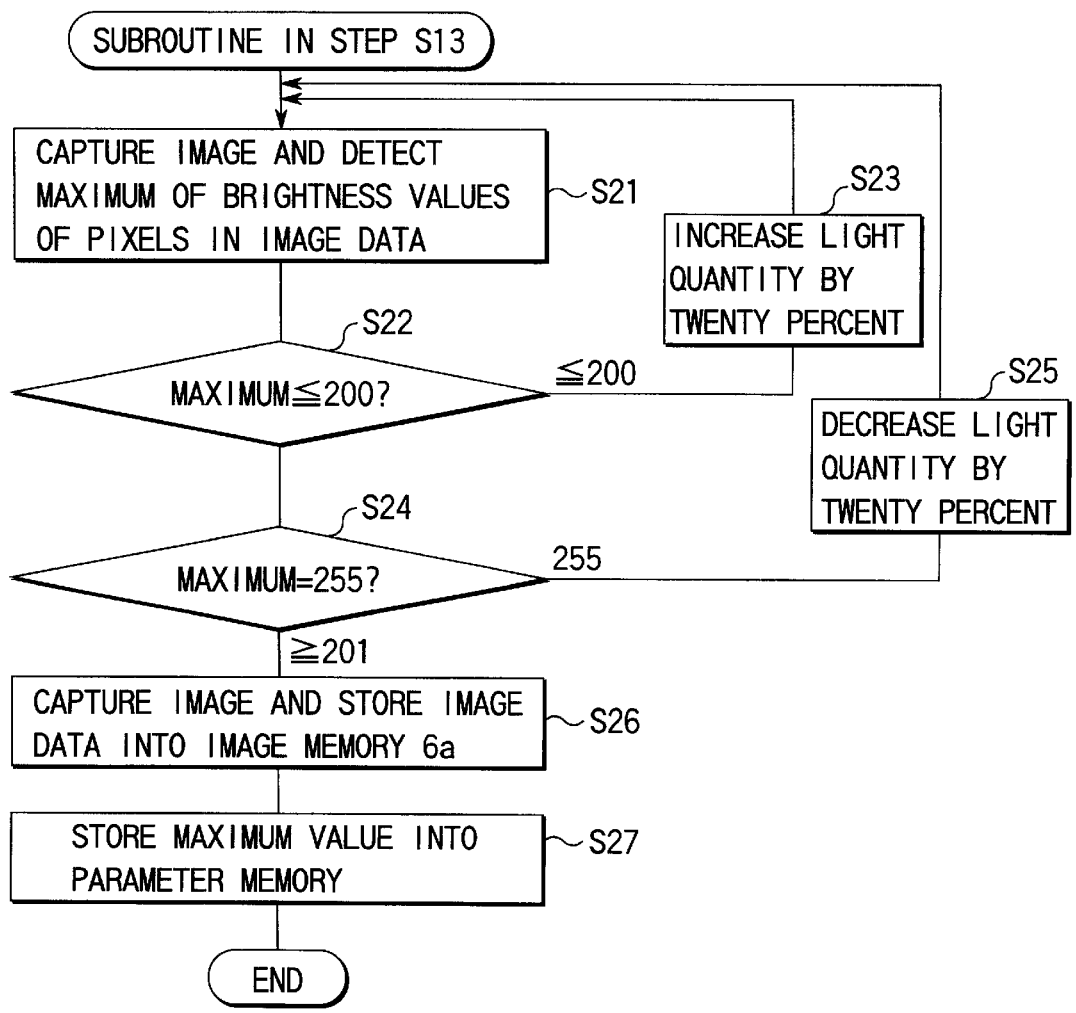
FIG. 6 is a flowchart illustrating the operation of the CPU in the code image quality checker of FIG. 3.

Reference is made to FIG. 6 to describe the operation of the CPU 4 of the code image quality checker of this embodiment.

Figure 4:
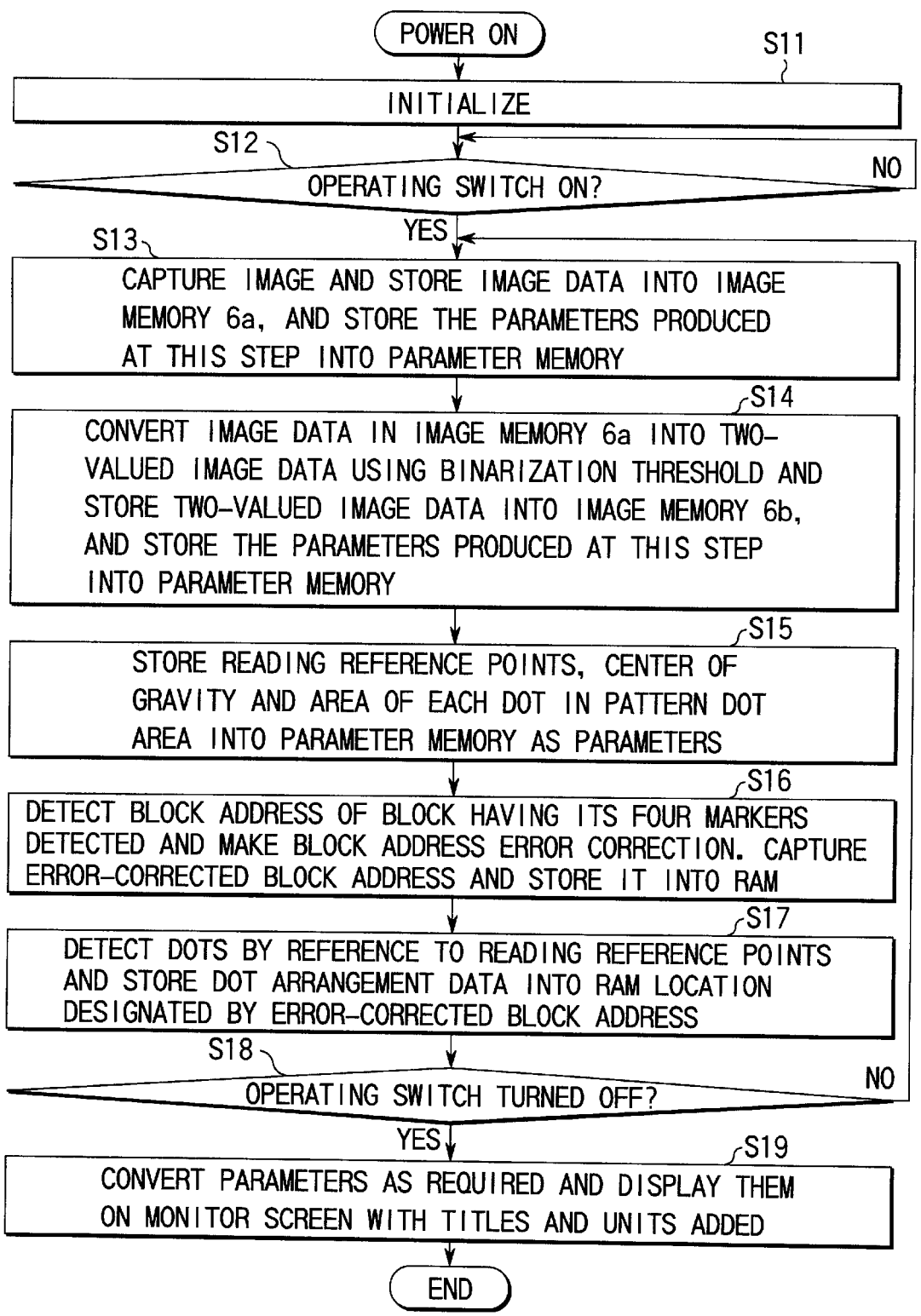
FIG. 4 is a flowchart illustrating the operation of the CPU in the code image quality checker of FIG. 3.

This subroutine is called into execution in step S13 of FIG. 4. The light quantity of the illumination section in the imaging unit 1 is initialized to the fifth light quantity in step S11 of FIG. 4.

Upon entry to this subroutine, the image unit 1 of FIG. 3 first captures an image and the CPU 4 then detects the maximum value of pixels in the captured image data (step S21). The CPU then compares this maximum value with 200 which is minimum value to determine the light quantity (step S22). If the maximum value is not more than 200, the light quantity setting is increased by twenty percent (step S23) and a return is made to step S21. In step S23, if the initial light quantity is the fifth light quantity, then a change is made to the fourth light quantity.

If, on the other hand, the maximum value is more than 200, a comparison is made between the maximum value and 255 (step S24). If the maximum value is equal to 255, then the light quantity is decreased by twenty percent (step S25). That is, if the initial light quantity is the fifth light quantity, then the light quantity setting is changed to the sixth light quantity.

If, in step S24, the maximum value is more than 255, then the image is captured and image data is stored in the image memory 6a (step S26). In subsequent step S27, the maximum value is stored in the parameter memory 6c. In this way, the subroutine terminates and the procedure returns to step S14 in the main routine of FIG. 4.

Although not shown in the flowchart of FIG. 6, changing of the setting in steps S23 and S25 becomes sometimes impossible. In such case, the procedure goes to step S26 with the initial light quantity setting maintained.

The code image quality checking device of the embodiment contains the imaging unit 1, and in reading a code image, the code image checker outputs the light quantity setting as parameter information from the parameter information output unit 8 for each captured image data (captured flame). That is, assuming that there are a first code image for which the light quantity is set to the fifth level and a second code image for which the light quantity is set to the first level, it is seen that, in the second code image, the density of reflections from white dots and white areas around the markers is greater, i.e., the white level is lower than in the first code image.

The first light quantity set for the second code image is the limit of setting above which the light quantity cannot be increased. In some cases, therefore, the image data is stored in the image memory 1 with the maximum value as 200 or below. In such cases, the contrast between block dots and white dots is so lower that it becomes difficult for the reader to distinguish between black dots and white dots, indicating the possibility of inability to read the image.

Thus, this embodiment is allowed to check the density of reflections from the medium itself that forms the white areas of the code image by setting light quantities. That is, as one of qualities of a code image, the density of reflections from a medium can be checked.

So far, description was given of the case where only black dots are printed on a white medium and white dots are formed of the white medium itself. The white area is not limited to use of a white medium. For example, black dots may be printed in black ink on a red medium. In this case, the white area is made to correspond with the red area other than the black dots. Further, black dots may be printed on a white medium and the area other than the black dots may be printed in red. In this case, the white area is made to correspond to the dot code area other than the black dot area. Further, in this case, the area in the image data in which the maximum value of the image data is detected in step S21 is within the dot code.

Fourth, description is given of the case where the parameter information is information concerning binarization, i.e., the binarization threshold and the area of each dot in the pattern dot area 104.

Hereinafter, more detailed description will be given mainly of a method of setting the binarization threshold in step S4 of FIG. 2. The changing of binarization threshold setting is repeated through repetitions of processing from steps S3 to S7 of FIG. 2. Finally, a binarization threshold is set which is the most suitable for the dot area in each imaging area of the code image.

First, a binarization threshold first set in step S3 is one set in the binarization threshold area in the initialization step. Two-valued image data subjected to binarization using this threshold is stored in the image memory 6b.

Next, in step S5, in calculating accurately the position of the center of each marker 102 as the reading reference point utilizing the value for the area of each dot in the pattern dot area 104, the thickness of each dot in the pattern dot area in the two-valued image data is detected. A binarization threshold set in step S4 for image data captured next time in step S3 is determined by the binarization threshold previously set in step S4 and the average area of the dots each having thickness detected in step S5 so that the average area of dots in the pattern dot area in two-valued image data corresponding to that image data captured next time becomes a target area. The binarization threshold thus determined is set in coming step S4.

In this way, the processing from step S3 to S8 is repeated until the operating switch is turned OFF, with the result that the binarization threshold value is set to fit the thickness of each dot in the pattern dot area.

Figure 2:
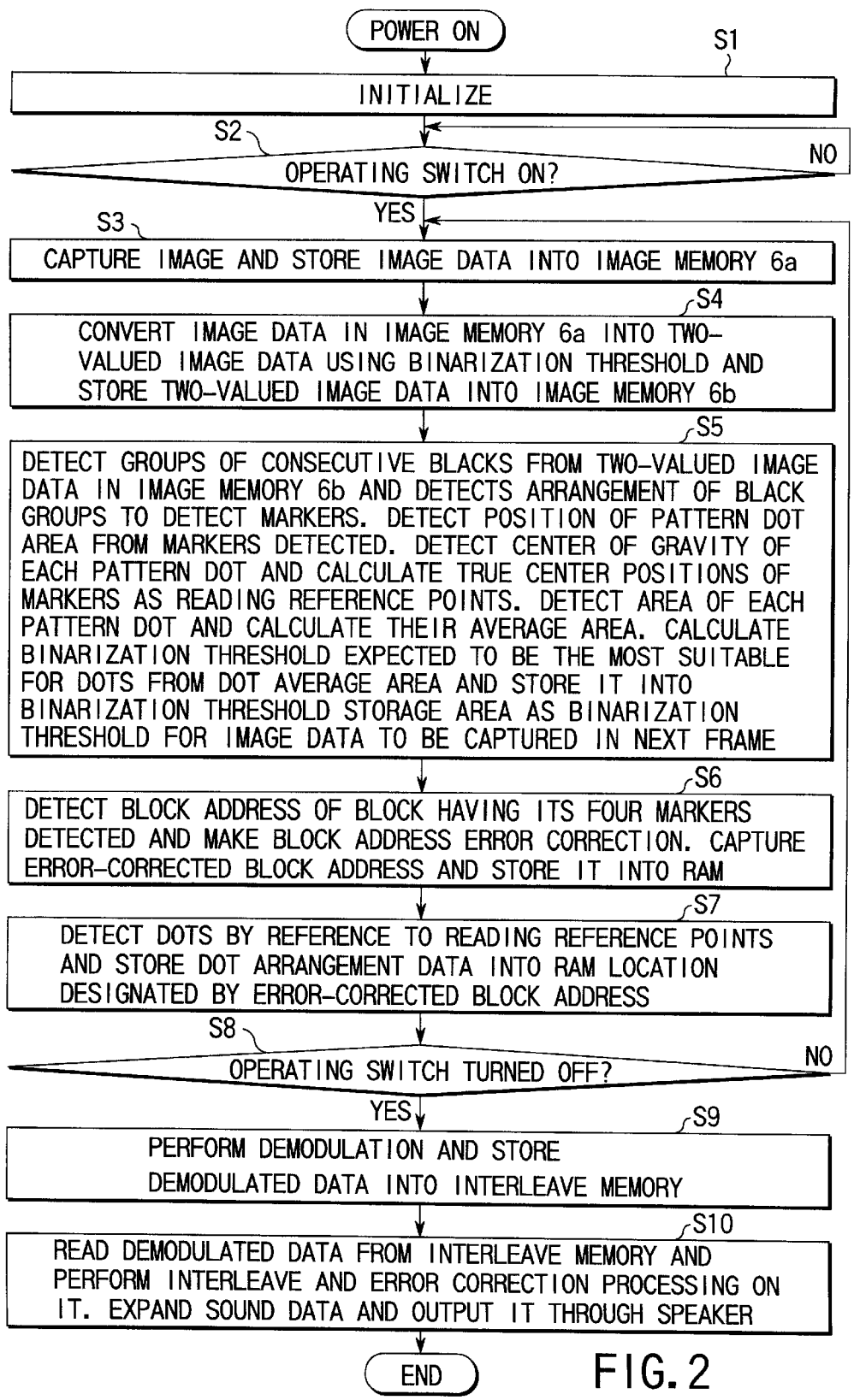
FIG. 2 is a flowchart illustrating the operation of the CPU in the code image reader of FIG. 1.

In the processing of FIG. 4, similar processing to the processing from step S3 to S8 of FIG. 2 is performed. In step S14 of FIG. 4, a binarization threshold is stored as parameter information into the parameter memory 6c.

The code image reader has a binarization section which, as with the above-described binarization threshold setting method, detects the thickness of each dot in the pattern dot area 104 and sets a binarization threshold for captured image data so that the thickness of each dot becomes a target thickness. That is, the code image quality checker that checks the quality of a dot code read with the code image reader outputs the binarization threshold as parameter information from the parameter information output unit 8.

The binarization threshold has strong correlation with the dot thickness, which allows the thickness of each dot in the pattern dot area 104 within the dot code 100 to be inspected. When the dots in the pattern dot area usually tend to have substantially the same thickness as the dots in the data area 103 of the code image, the thickness of the dots in the entire code image is checked as one of qualities.

The imaging unit 1 covers only part of the code image. Thus, reading of the entire code image needs scanning by the imaging unit. The binarization threshold is determined for each part of the code image captured by the imaging unit. By outputting a threshold value for the dots in each captured picture from the pattern information output unit 8, the state in which the dot thickness changes within the dot code 100 can also be checked.

Thus, statistical values, such as the average, the maximum, and the minimum of thickness of dots in the dot code 100, and standard deviations of variations in dot thickness can also be calculated. The parameter information output from the parameter information output unit 8 may be such statistical values. Although the embodiment has been described as using the binarization threshold as the parameter information, the dot average area, or the dot thickness, is allowed to be output as parameter information.

Furthermore, other parameters than the above-described parameter may be output each time part of the code image is captured by the imaging unit, which allows each part of the code image to be measured and checked. The other parameters may indicate all the parameters used in the imaging unit, the binarization unit, and the restoration unit for adaptive control.

For example, although, in step S5 or S15, the two-valued image data stored in the image memory 6b is used to calculate the area of each dot in the pattern dot area 104, the image data stored in the image memory 202 may be used instead.

Here, the conversion operation of outputting the parameters information will be described in more detail with the relationship between the quality items and the parameters of FIG. 5 in mind.

FIG. 5 shows a case where the dot diameter is not up to the standard and is a maximum of 80 $\mu$m, a minimum of 60 $\mu$m, and averages 70 $\mu$m. The dot diameter is calculated from the dot area as the diameter of a circle. The dot average diameter is calculated from the area of each dot in the pattern dot area as described previously in step S15. The binarization threshold is determined from the dot average area. The dot average area can be inversely calculated from the binarization threshold.

The level of whiteness of paper, which is up to the standard, is a maximum of 4, a minimum of 6, and averages 5. The level of whiteness of paper is indicated by the light quantity setting value itself. The first to tenth light quantity settings of the illumination section as the result of adaptive control are determined as the paper whiteness levels of 1 to 10. The marker-to-marker distance indicates numerical values obtained from the conversion of the reading reference points. The P dot distance ($\mu$m) indicates dot-to-dot spacing in horizontal direction of pattern dot. The dot-to-dot spacing is determined by the center of gravity of pattern dot which is determined at step S12. An average and maximum of dot-to-dot spacings are calculated, and the average and maximum are displayed as "P dot distance ($\mu$m)". The variance in P transverse position indicates variance in vertical direction of pattern dot. The variance is determined by the center of gravity of pattern dot. FIG. 5 shows 5 $\mu$m variance in light direction and 3 $\mu$m variance in left direction.

That is, at the converting operation (step S19), the conversion section converts various parameters into numerical values as indicated under titles that are suitable for quality items of the parameters and are easy to understand.

Figure 9:
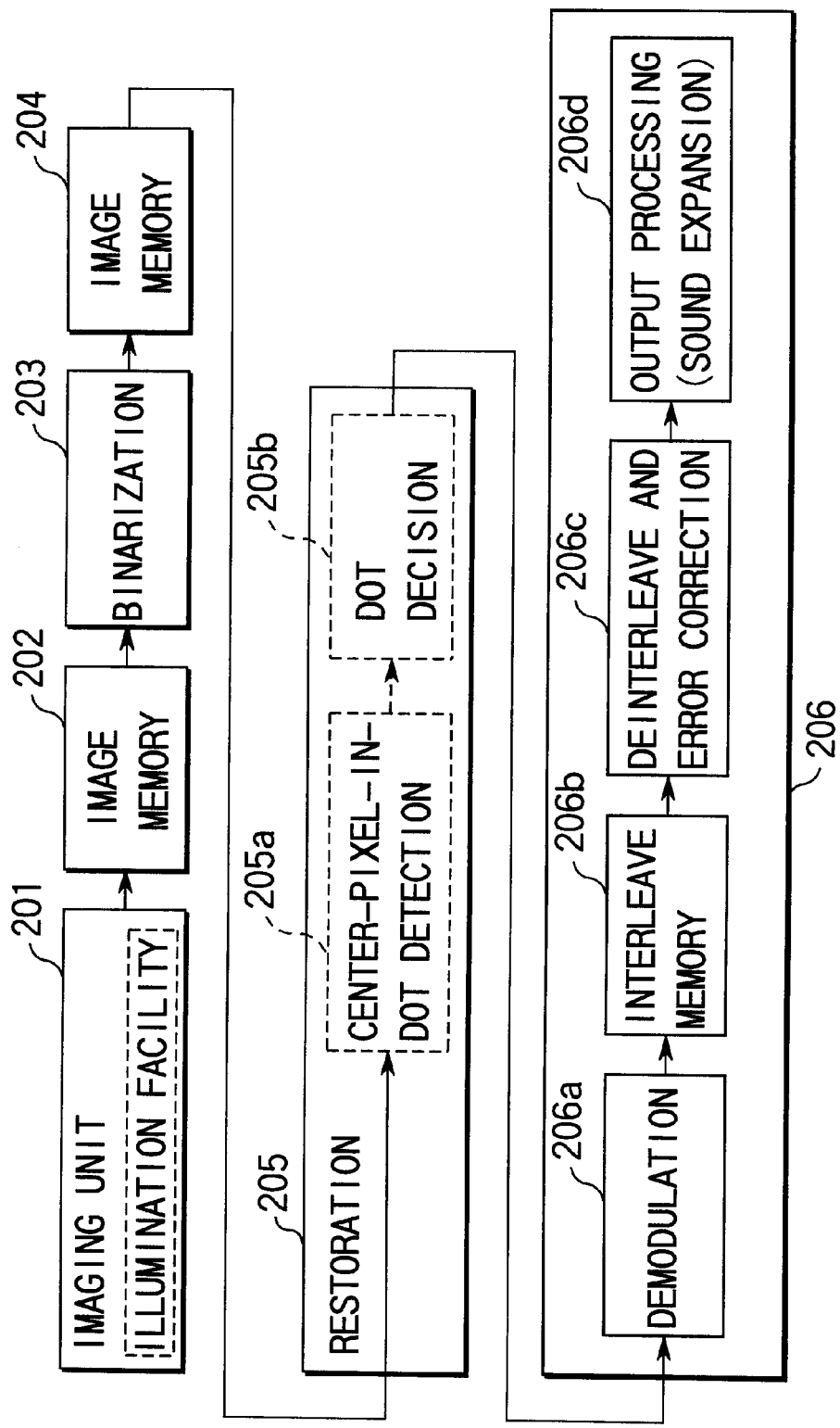
FIG. 9 is a functional block diagram of a conventional code image reader for optically reading the dot code shown in FIG. 8.

When each of the components in the prior art code image reader shown in FIG. 9 consists of an IC chip, the parameter information can be taken from signal terminals of each IC chip and outputted through the parameter information output unit.

FIG. 7 shows an arrangement of an IC chip-based code image quality checker according to a second embodiment of the present invention.

As shown, the code image quality checker comprises an image unit 12 for capturing a dot code, an image memory 13 for storing image data from the imaging unit, a binarization unit 14 for converting the image data from the image memory into two-valued image data, an image memory 15 for storing the two-valued image data from the binarization unit, a restoration unit 16 for recovering original dot arrangement information consisting of 1s or 0s corresponding to black dots or white dots from the image data stored in the image memory 15, and a parameter information output unit 11 for outputting intermediate parameter information generated by the image memory 13, binarization unit 14, image memory 15, and restoration unit 16 through its IC chip signal terminals as it is or in the form of display or audio data after predetermined operations or conversion.

According to such an arrangement, even if the code image reader comprises a single CPU, a plurality of CPUs, or a plurality of IC chips, intermediate parameter information can be outputted to check the quality of a code image. The employment of the circuits and programs of the code image reader allows the time and cost required to develop the code image quality checker to be reduced.

The present invention may be practiced or embodied in still other ways without departing the scope and spirit thereof.

The embodiments of the present invention are summarized as follows:

(1) A code image quality checker for checking the quality of a code image which contains a plurality of dots arranged in accordance with data containing at least sound information and is optically readably recorded in a given format on a portion of a recording medium, comprising:
  imaging means for capturing the code image on the recording medium and outputting an image signal;
  binarization means for subjecting the image signal from the imaging means to binarization to output two-valued image data;
  restoration means for detecting the dots from the two-valued image data and allocating each of the dots detected for a value of either 1 or 0 to output dot arrangement data;
  reproduction unit responsive to the dot arrangement data from the restoration means to recover the data containing at least sound information;
  adaptive read control means for adaptively controlling the operation of each of the imaging means, the binarization means, the restoration means, and the reproduction means according to the quality of the code image; and
  parameter information output means for outputting to outside parameter information used by the adaptive read control means to control adaptively the operation of each of the imaging means, the binarization means, the restoration means, and the reproduction means, the parameter information being employed to check the quality of the code image.

According to this configuration, therefore, the quality of the adaptively read code image can be measured easily and checked based on the parameter information and a good code image quality checker can be provided.

(2) The code image quality checker as defined in (1), wherein the imaging unit includes an illumination means for illuminating the code image, the adaptive read control unit controls an illumination light quantity of the illumination means in order to control adaptively the operation of the imaging means, and the parameter information output means outputs information concerning the illumination light quantity as the parameter information.

According to this configuration, the density of ground color or the level of whiteness of the recording medium can be measured and checked as one of qualities of the code image using the information concerning the illumination light quantity, and a good quality checker can be provided which checks the quality of the code image that the reader adaptively reads while controlling the illumination light quantity.

(3) The code image quality checker as defined in (1), wherein the binarization means includes a binarization threshold setting means for setting a threshold for converting an image signal into a two-valued image signal, the adaptive read control means controls the threshold set by the binarization threshold setting means in order to control adaptively the operation of the binarization means, and the parameter information output means outputs information concerning the threshold as the parameter information.

According to this configuration, a margin of control of the binarization threshold as one of qualities of the code image can be measured and checked based on information concerning the binarization threshold, and a good quality checker can be provided which checks the quality of the code image that the reader adaptively reads while controlling the binarization threshold.

(4) The code image quality checker as defined in (3), wherein the adaptive read control means controls the threshold set by the binarization threshold setting means so that the area of dots which depends on the threshold becomes a given one, and the parameter information output means outputs information concerning the area of dots as information concerning the threshold.

According to this configuration, the area of the dots as one of qualities of the code image can be measured and checked based on information concerning the binarization threshold, and a good quality checker can be provided which checks the quality of the code image that the reader adaptively reads on the dot area.

(5) The code image quality checker as defined in (1), wherein the restoration means includes detect reference point setting means for setting detect reference points for detecting the dots on the basis of at least one of the two-valued image data from the binarization means and the image data from the imaging means, the adaptive read control means controls the detect reference points set by the detect reference point setting means in order to control adaptively the operation of the restoration means, and the parameter information output means outputs information concerning the detect reference points as the parameter information.

According to this configuration, the positional relationship among the detect reference points as one of qualities of the code image can be measured and checked based on information concerning the detect reference points, and a good quality checker can be provided which checks the quality of the code image that the reader adaptively reads based on the detect reference points. In mechanism-based low-cost printers in particular, the degradation of accuracy of recording positions due to poor accuracy of the mechanism can be checked, which allows the accuracy of the printers to be checked indirectly.

(6) The code image quality checker as defined in (5), wherein the detect reference point setting means includes pattern dot searching means for searching at least one of the two-valued image data from the binarization means and the image data from the imaging means for a plurality of pattern dots required to calculate and set the detect reference points and pattern dot center calculation means for calculating the position of the center of each of the pattern dots searched for by the pattern dot searching means, and the parameter information output means outputs information concerning the position of the center of each of the pattern dots as information concerning the detect reference points.

According to this configuration, the positional relationship among the centers of the pattern dots as one of qualities of the code image can be measured and checked based on information concerning the center positions of the pattern dots, and a good quality checker can be provided which checks the quality of the code image that the reader adaptively reads based on the center position of each pattern dot.

(7) The code image quality checker as defined in (1), wherein the parameter information output means includes conversion means for converting parameter information used in the adaptive read control means into numerical information suitable for checking and outputting it.

According to this configuration, the parameter information can be converted into the most suitable form for understanding. For example, by converting the parameter information into usually used terms, such as density and size, objective indexes can be provided.

(8) The code image quality checker as defined in (7), further comprising decision means for deciding whether the code image is good or not on the basis of the numerical information from the conversion means.

According to this configuration, whether the code image is good or not can be decided by the decision means correctly and quickly. Automation of quality checking is also possible.

(9) The code image quality checker as defined in (8), wherein the decision means makes a synthetic decision of whether the code image is good or not on the basis of a plurality of types of numerical information associated with a plurality of types of parameter information.

According to this configuration, the quality of the code image can be decided and checked correctly using a plurality of quality items associated with the plurality of types of parameter information.

(10) The code image quality checker as defined in (9), wherein the decision means includes display means for displaying the plurality of types of numerical information and the result of the synthetic decision in the form of a table.

According to this configuration, the checking can be made in an efficient manner and the cost of production can be reduced. In case where the quality is bad, the reason can be judged by the plurality of types of numerical information.

(11) The code image quality checker as defined in (1), wherein, when the size of the entire code image is larger than the imaging area of the imaging means and the code image is captured by manually moving the imaging means over the code image while scanning each of contiguous regions of the code image in sequence, the parameter information output means outputs the parameter information for each image portion captured by the imaging means.

According to this configuration, each part of the code image can be checked in sequence using the parameter of each captured pictures, allowing the code image to be checked exactly.

As described above, the present invention provides a code image quality checker which is suitable for a code image having dots printed at high density and allows the time required to check the qualities of the code image to be minimized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A code image quality checker for checking the quality of a code image which contains a plurality of dots arranged in accordance with data and which is optically readably recorded In a given format on a portion of a recording medium, said code image quality reader comprising:

imaging means for capturing the code image on the recording medium and outputting an image signal;

binarization means for subjecting the image signal from the imaging means to binarization to output two-valued image data;

restoration means for detecting the dots from the two-valued image data and allocating each of the dots detected for a value of either 1 or 0 to output dot arrangement data;

adaptive read control means for adaptively controlling the operation of each of the imaging means, the binarization means and the restoration means according to the quality of the code image; and parameter information output means for outputting parameter information used by the adaptive read control means to control adaptively the operation of each on the imaging means, the binarization means and the restoration means, said parameter information being employed to check the quality of the code image.

2. The code image quality checker according to claim 1, wherein the imaging unit includes an illumination means for illuminating the code image, the adaptive read control unit controls an illumination light quantity of the illumination means in order to control adaptively the operation of the imaging means, and the parameter information output means outputs information concerning the illumination light quantity as the parameter information.

3. The code image quality checker according to claim 1, wherein the binarization means includes a binarization threshold setting means for setting a threshold for converting an image signal into a two-valued image signal, the adaptive read control means controls the threshold set by the binarization threshold setting means in order to control adaptively the operation of the binarization means, and the parameter information output means outputs information concerning the threshold as the parameter information.

4. The code image quality checker according to claim 3, wherein the adaptive read control means controls the threshold set by the binarization threshold setting means so that the area of dots which depends on the threshold becomes a given one, and the parameter information output means outputs information concerning the area of dots as information concerning the threshold.

5. The code image quality checker according to claim 1, wherein the restoration means includes detect reference point setting means for setting detect reference points for detecting the dots on the basis of at least one of the two-valued image data from the binarization means and the image data from the imaging means, the adaptive read control means controls the detect reference points set by the detect reference point setting means in order to control adaptively the operation of the restoration means, and the parameter information output means outputs information concerning the detect reference points as the parameter information.

6. The code image quality checker according to claim 5, wherein the detect reference point setting means includes pattern dot searching means for searching at least one of the two-valued image data from the binarization means and the image data from the imaging means for a plurality of pattern dots required to calculate and set the detect reference points and pattern dot center calculation means for calculating the position of the center of each of the pattern dots searched for by the pattern dot searching means, and the parameter information output means outputs information concerning the position of the center of each of the pattern dots as information concerning the detect reference points.

7. The code image quality checker according to claim 1, wherein the parameter information output means includes conversion means for converting parameter information used in the adaptive read control means into numerical Information suitable for checking, and means for outputting the numerical information.

8. The code image quality checker according to claim 7, further comprising decision means for deciding whether the code image is good or not on the basis of the numerical information from the conversion means.

9. The code image quality checker according to claim 8, wherein the decision means makes a synthetic decision of whether the code image is good or not on the basis of a plurality of types of numerical information associated with a plurality of types of parameter information.

10. The code image quality checker according to claim 9, wherein the decision means includes display means for displaying the plurality of types of numerical information and the result of the synthetic decision in the form of a table.

11. The code image quality checker according to claim 1, wherein, when the size of the entire code image is larger than the imaging area of the imaging means and the code image is captured by manually moving the imaging means over the code image while scanning each of contiguous regions of the code image in sequence, the parameter information output means outputs the parameter information for each image portion captured by the imaging means.

* * * * *

UNITED STATES PATENT AND TRADEMARK OFFICE
CERTIFICATE OF CORRECTION

PATENT NO. : 6,587,591 B1
DATED : July 1, 2003
INVENTOR(S) : Shinzo Matsui

It is certified that error appears in the above-identified patent and that said Letters Patent is hereby corrected as shown below:

<u>Title page,</u>
Item [57], ABSTRACT,
Line 1, change "us" to -- is --

Signed and Sealed this

Fourteenth Day of October, 2003

JAMES E. ROGAN
*Director of the United States Patent and Trademark Office*